United States Patent [19]

van de Polder

[11] Patent Number: 4,652,904
[45] Date of Patent: Mar. 24, 1987

[54] TELEVISION SYSTEM WITH IMPROVED DEFINITION IN FIELD SCANNING DIRECTION

[75] Inventor: Leendert J. van de Polder, Eindhoven, Netherlands

[73] Assignee: U.S. Philips Corporation, New York, N.Y.

[21] Appl. No.: 678,302

[22] Filed: Dec. 5, 1984

[30] Foreign Application Priority Data

Dec. 5, 1983 [NL] Netherlands .................. 8304163

[51] Int. Cl.[4] .................................. H04N 11/06
[52] U.S. Cl. .............................. 358/12; 358/14
[58] Field of Search ............................ 358/12, 14

[56] References Cited

U.S. PATENT DOCUMENTS

| | | | |
|---|---|---|---|
| 4,429,327 | 1/1984 | Oakley et al. | 358/12 |
| 4,473,837 | 9/1984 | Tiemann | 358/12 |
| 4,476,484 | 10/1984 | Haskell | 358/16 |
| 4,485,401 | 11/1984 | Tan et al. | 358/12 |
| 4,521,803 | 6/1985 | Gittinger | 358/12 |

Primary Examiner—Michael A. Masinick
Assistant Examiner—Robert M. Bauer
Attorney, Agent, or Firm—Thomas A. Briody; William J. Streeter; Marianne R. Rich

[57] ABSTRACT

A television system with enhanced definition in the field scanning direction is presented. In the information transmitter a video signal source is coupled directly and via line delay device with a subtraction circuit followed by a modulator with a subcarrier. An adding circuit is coupled with the output of the modulator and the source, possibly via the delay device. The resultant difference information is transmitted frequency-interleaved with the video information under control of a movement detector, to the information receiver. The receiver contains a filter circuit for separating the information. The modulated subcarrier goes via a demodulator to a superposition circuit to which further the video information is also supplied. The output of the superposition circuit is connected via a line delay device to one input of a switch-over circuit. The video information is supplied to a second input of the switch-over circuit. The supplied information on said first and second inputs is passed on by the switch-over circuit during alternate line periods. The result is an improvement of picture definition upon display in the field scanning direction.

22 Claims, 7 Drawing Figures

TELEVISION SYSTEM WITH IMPROVED DEFINITION IN FIELD SCANNING DIRECTION

BACKGROUND OF THE INVENTION

1. Technical Field

The invention relates to a television system with transmission of additional information pertaining to the television field scanning direction, wherein luminance or chrominance information, respectively, is transmitted over a transmission channel from an output of an information transmitter to an input of at least one information receiver, which additional information modulates a subcarrier which in an interleaving frequency system is transmitted with the luminance or chrominance information, respectively, and further relates to a suitable information transmitter and receiver.

2. Background Art

A television system of the kind described is known from an article entitled "Time division multiplex of time compressed chrominance for a compatible high definition television system", published in the journal "IEEE Transactions on Consumer Electronics", Vol. CE-28, No. 4, November 1982, on pages 592 up to and including 602, in particular on page 600, right column, paragraphs 1 and 2. Instead of, as in the NTSC or PAL colour television standard, chrominance information modulating the (colour) subcarrier, additional detail information pertaining to the field scanning direction and the line scanning direction modulates the subcarrier which is then transmitted interleaved with the luminance information. At the same time the chrominance information is transmitted time-compressed in the time division multiplex system. When the signal transmitted with the additional detail information is displayed on a display screen the picture definition is improved at those places where static picture information occurs. It is described that where locally changing picture information occurs, the additional detail formation does not have to be used in the display. By means of a movement detector the transmission of the additional detail information is then interrupted.

SUMMARY

In the said article no embodiment is given of a circuit diagram for the information transmitter and receiver suitable for application in the system involving transmission of additional detail information. The article describes in particular colour television system wherein the additional detail information pertaining both to the field and the line scanning directions is transmitted interleaved with the luminance information.

An object of the invention is the realization of a television system suitable for both monochrome and colour television in which, with a simple embodiment of the information transmitter and receiver, the improved definition upon display of the additional information pertains mainly to the field scanning direction. Upon display, the definition of static picture information is improved in the field scanning or vertical direction. A television system in accordance with the invention is characterized in that the information transmitter is provided with a video signal source an output of which, via a first delay device having a time delay equal to a line period of the video signal source, and also undelayed, is coupled with inputs of a subtraction circuit, an output of the subtraction circuit (i.e. difference signal) being coupled with an input of a modulator which is provided with another input supplied with a subcarrier. An output of the modulator is coupled with an input of a first adding circuit which is provided with another input which is coupled with the output of the video signal source or delay device, respectively. An output of the first adding circuit is coupled with the output of the information transmitter. The information receiver of the current invention is provided with a filter circuit, connected to the input thereof, for separating the modulated subcarrier and the luminance or chrominance information, respectively, an output of the filter circuit with the modulated subcarrier being coupled with an input of a demodulator which is provided with another input supplied with the same subcarrier. An output of the demodulator coupled with an input of a superposition circuit which is provided with another input coupled to the filter circuit output with the luminance or chrominance information, respectively. An output of the superposition circuit is coupled via a second delay device having a time delay equal to the line period of the video signal source, with a first input of a switch-over circuit. The filter circuit output with the luminance or chrominance information, resepectively, is coupled to a second input of the switch-over circuit. The first and second inputs of the switch-over circuit, during the said line periods, are alternately coupled with the switch-over circuit output which, in turn, is coupled to an input of a display device or, respectively, to a signal pick-up and display device.

The television system in accordance with the invention, showing the improvement of definition obtained in the field scanning direction, is primarily of importance in the combination of a transmission channel having a limited transmission capacity and a video signal source of larger bandwidth. Without further measures the complete information supplied by the source cannot immediately be transmitted. An example that may be mentioned is the signal transmission in accordance with the SECAM colour television standard, whereby although the complete luminance information is transmitted in a television line period, only half the chrominance information pertaining to that line is transmitted. Of each two successive television lines the one colour difference signal (for example R-Y) of the one line is then transmitted and the other colour difference signal (B-Y) of the other line, is transmitted as half the chrominance information. The same signal structure with transmission of half the (time-compressed) chrominance information is described in the aforesaid article and is referred to as a line sequential transmission system.

Another example is the combination of a transmission channel of limited bandwidth, for example, suitable for a 625 or 525 line standard, and of a high-definition video signal source of higher bandwidth, operating for example with more or less twice the number of lines in the same television frame or field period. In this method it is known that the line period pertaining to the video signal source can be expanded to twice the value (the standard line period) and then per frame period half of the originally present information is then transmitted frame-sequentially. In this case, too, advantageous use can be made of the television system in accordance with the invention to improve definition in the field or vertical scanning direction.

A further improvment of definition upon display can be obtained in accordance with the invention by providing a second adding circuit in the information transmitter. Inputs of the second adding circuit are coupled with the output of the video signal souce and the first delay device, respectively. Via this second adding circuit the output of the video signal source is coupled with the input of the first-mentioned adding circuit. Since, in addition to the difference value of two sets of information, a sum value thereof generated by said second adding circuit is also transmitted, the original information values can be determined in a more accurate manner in the information receiver.

It is noted that it is known from the British patent application No. 2 107 151 that information pertaining to the field scanning direction in a colour television system can be combined with chrominance information with the aid of two complementary comb filters, after which the colour carrier is modulated. It is described therein that the field scanning lines are divided into discrete groups of two simultaneously occurring lines, whereby the simultaneous sets of information are processed after a subtraction and an addition and halving. For obtaining the simultaneous sets of information two embodiments of the video signal source are given, using a television camera operating with interlacing and which is based on the three primary colours of light, namely green, red and blue. In the first embodiment there are two pick-up elements for each primary colour, and the line scans are shifted over a quarter of a line height. In the second embodiment there is one pick-up element and a wobble-generator present for each primary colour, whereby instead of a straight line being scanned a wobbulated line is scanned in the line scanning direction with a wobbulation over a quarter of the line height. In both cases the additional information in the field scanning direction is supplied by the difference information obtained by the subtraction between the two lines of the discrete groups of two lines or between the highest and the next lowest point in the wobbulated line or vice versa. The additional difference information derived by way of example only in the green colour channel and the chrominance information for combination of which the I information in the NTSC system is taken by way of example, are supplied via the complementary comb filters to an adding circuit, which is followed by quadrature modulation in the known manner. Here each of the two comb filters is implemented with a delay device having a time delay equal to the line period of the video signal source, followed in the one case by an adding circuit and in the other by a subtraction circuit, of which another input is directly connected to the input of the appertaining delay device.

In the information receiver of the referenced British patent application, the combined difference information and colour information can be separated from each other in a like manner and then supplied to a suitably adapted picture display device.

A comparison of the proposal in the British patent application with the proposal in the present application shows that the latter involves a simpler embodiment of the video signal source without the use of an additional pick-up element or wobble-generator, and that further the additional information does not belong to discrete groups each consisting of two television lines but rather, in a continuous way without steps, two successive television lines. This advantage for picture quality is obtained by the application of the delay device having a time delay equal to the line period and connected to the video signal source. Further the subcarrier is used purely and simply for transmitting the additional information, so that there is no crosstalk with chrominance information, which will be likely to occur when non-ideal complementary comb filters are used. The information receiver in accordance with the present proposal has the advantages of a simple implementation for recovering the additional information and for performing the subsequent sequential backformation of the line information, without the use of a wobble-generator, requiring synchronisation, in each receiver.

A further improvement of definition upon display can be obtained in an embodiment of a television system in accordance with the invention which is characterized in that a first low-pass filter is present in the information transmitter between the output of the video signal source and the input of the first-mentioned adding circuit coupled with it. A third adding circuit is present, an input of which is coupled, via a high-pass filter complementary to the first low-pass filter, with the output of the video signal source. Another input of the third adding circuit is coupled with the output of the modulator. Via this third adding circuit, the output of the modulator is coupled with the input of the first-mentioned adding circuit. Between the output of the third adding circuit and the input of the first adding circuit there is an off-on switching circuit, provided with a switching signal input which is coupled with an output of a movement detector. In operation, upon changes in information (i.e. detection of movement), only low-frequency information is transmitted, which is advantageous for the picture quality.

For the purpose of transmitting the difference information with a particular desired frequency spectrum, an embodiment of a television system in accordance with the invention is characterized in that a second low-pass filter is employed in the information transmitter between the output of the said subtraction circuit and the input of the modulator coupled with it, and a first band-pass filter is employed between the output of the modulator and the input of the first-mentioned adding circuit coupled with it.

When a change of information occurs only in two steps, taking place in three successive frame periods, a further improvement of definition can be obtained in an embodiment of a television system in accordance with the invention which is characterized in that the information transmitter contains a third delay device, having a time delay equal to a television frame period, between the output of the video signal source and the input of the first-mentioned adding circuit coupled with it.

An embodiment of a television system in accordance with the invention, in which movement detection is performed in an optimum manner, is characterized in that in the information transmitter, when it contains an off-on switching circuit for the transmission of the modulated subcarrier, depending on whether or not there is movement detection by means of a movement detector coupled with a switching signal input of the switching circuit, the said detector is implemented in such a way that the first-mentioned delay device is followed by a series arrangement of a fourth delay device, having a time delay equal to the television frame period minus a line period belonging to the video signal source, and a fifth delay device having a time delay equal to a like line period. Two inputs of a second subtraction circuit are coupled with the input and output of the series arrangement and two inputs of a third subtraction circuit are coupled with the output of the video signal source and the output of the fourth delay device in the said series arrangement. An output of the second and third subtraction circuits, respectively, are coupled via a full-wave rectifying circuit and a threshold circuit with the switching signal input of the off-on switching circuit.

Depending on the frequency spectrum of the luminance and chrominance information, respectively, a further optimisation of the movement detection can be obtained in an embodiment which is characterized in that the threshold circuit in the information transmitter is preceded by a third low-pass filter.

A simple embodiment of a television system in accordance with the invention is characterized in that the filter circuit in the information receiver is implemented with a bandpass filter characteristic and a notch filter characteristic. An input of the filter circuit is coupled with the input of the information receiver. The notch filter characteristic is present between the filter circuit output with the luminance or chrominance information, respectively, and its input, while between the output with the modulated subcarrier and the input the bandpass filter characteristic is present.

Another, less noise-sensitive embodiment is characterized in that the filter circuit in the information receiver is implemented with a sixth delay device having a time delay equal to one television frame period. An input thereof is coupled via a high-pass filter with the input of the information receiver. Inputs of a fifth adding a fourth subtraction circuit are coupled with the input and output of the sixth delay device. The output of the fifth adding circuit is coupled with an input of a sixth adding circuit another input of which is coupled via a lowpass filter with the input of the information receiver. An output of the sixth adding circuit serves as the filter circuit output for the delivery of the luminance or chrominance information, respectively; the output of the fourth subtraction circuit serves as the filter circuit output for delivery of the modulated subcarrier.

An embodiment of a television system in accordance with the invention in which a difference and a sum value of two original informations are transmitted is characterized in that when the superposition circuit in the information receiver is implemented as a subtraction circuit, a seventh adding circuit is employed, an input of which is coupled with the output of the demodulator and another input is coupled with the output of the filter circuit. The latter output is coupled via the seventh adding circuit with the switch-over circuit.

BRIEF DESCRIPTION OF THE DRAWINGS

The invention will be further described with reference to the drawings appended by way of example, in which.

DETAILED DESCRIPTION

Figure 1:
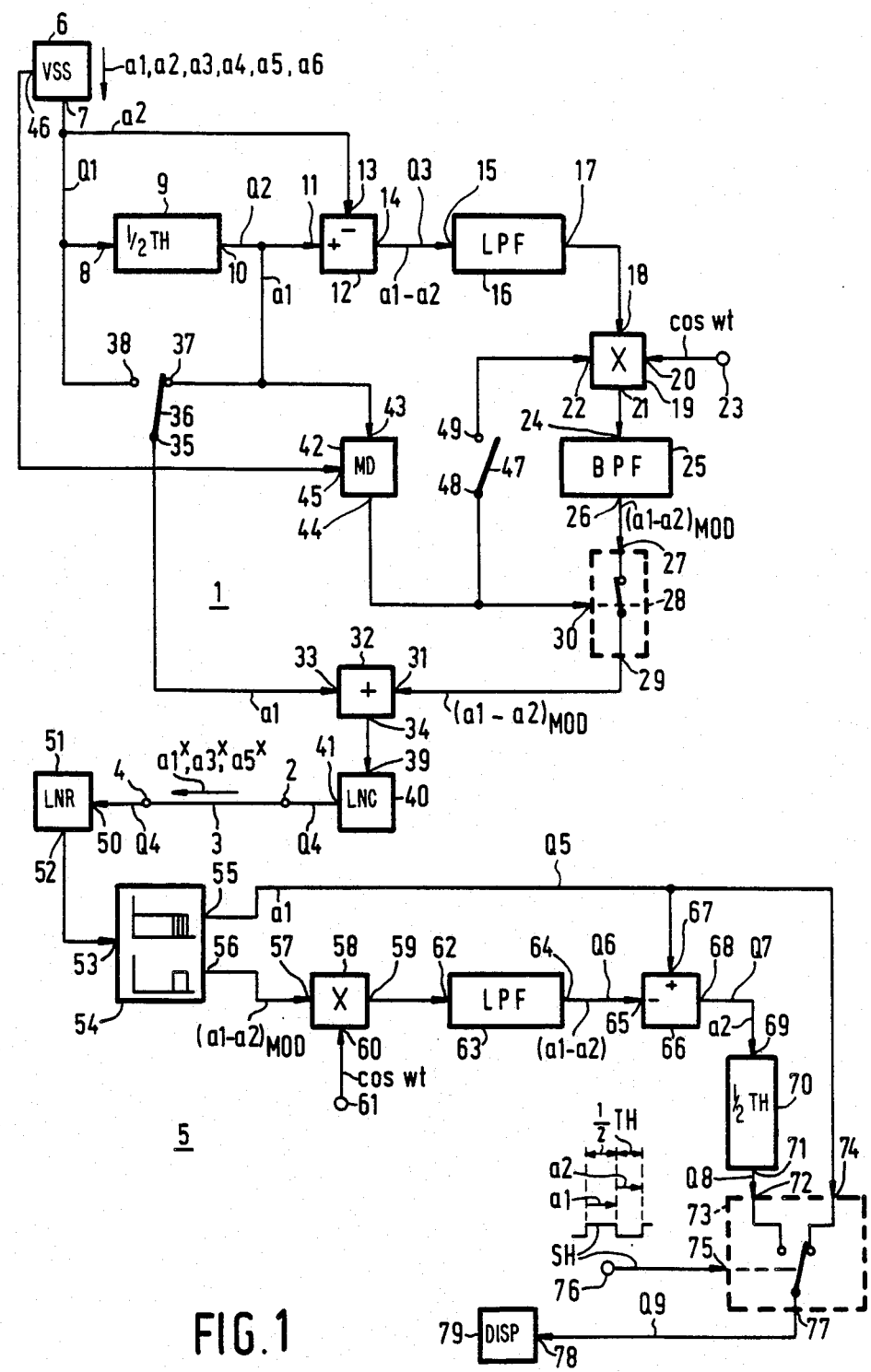
FIG. 1 shows a block diagram of an embodiment of a television system in accordance with the invention, with an information transmitter and information receiver linked by a transmission channel.

FIG. 1 shows an embodiment of a television system in accordance with the invention in which 1 denotes an information transmitter provided with an output 2. The output 2 is coupled via a transmission channel 3 with an input 4 of one receiver 5 of possibly many information receivers (not shown). The transmission channel 3 is drawn as a line connection, but is deemed to comprise all possible television connections, via the ether, wire and cable, directly from a station on earth or from space by means of a satellite link. The television system in FIG. 1 may further be suitable for monochrome television or four colour television in which luminance and chrominance information is transmitted separately, without frequency interleaving.

In the information transmitter 1 the numeral 6 denotes a video signal source which is provided with a video signal output 7. In the source 6 the designations a1, a2, a3, a4, a5, a6 and so on denote a video information flow. The information a is deemed to belong to a television line period as present with the video signal source 1. In the embodiment of the source 1 as a television camera, information which it picks up is converted by line and field scanning means into a picture signal with which, together with line and field synchronisation and blanking signals, the video signal is mainly formed. With possible interlacing, several fields form a frame (complete picture). In this case a frame period (TP) comprising several field periods (TV) is present. With the single interlacing laid down in television standards, two field periods form one frame period (TP=2TV). Instead of as a television camera, the source 6 may further, for example, be embodied in the form of a tape or disc pick-up and/or reproduction device or as a film-television converter.

Independent of the embodiment of the video signal source 6, it may be stated in general that for the television system there is a preference for improvement of the picture definition upon display in the field scanning or vertical direction. For this purpose the source 6 has to deliver information with a larger frequency bandwidth than can be transmitted by the transmission channel having a more limited bandwidth. As an example, mention is made of an embodiment of the source 6 suitable for the SECAM colour television standard with its line-sequential transmission of chrominance. Another example is an embodiment of the source 6 suitable for high-definition television, whereby the transmission channel 3 has only about half the required bandwidth. Consequently only half the information available for the transmission can be transmitted, and a field-sequential transmission is the result. This is illustrated schematically in FIG. 1 for the transmission channel 3 with an information flow a1$^x$, a3$^x$, a5$^x$ derived from the original information flow a1, a2, a3, a4, a5, a6. The information a$^x$ is stated to belong to a line period (TH) as laid down in a 625 or 525 line standard. With single interlacing and a field frequency of 50 or 60 Hz, it follows for the standard line period TH that this is equal or more or less equal to 64 $\mu$S. In light of the foregoing, it follows that the line period belonging to the video signal source is practically equal to ½ TH, for the same frame period TP=2TV.

For the forming of the information a$^x$ from the original information a, FIG. 1 shows a possible embodiment of an information transmitter. The output 7 of the video signal source (VSS) 6 is coupled or connected with an input 8 of a first delay device 9 which is implemented with an output 10. The delay device 9 has a time delay equal to the line period ($\frac{1}{2}$TH) belonging to the source 6. In the case where the information a1 at any given instant is present at the output 10, the instantaneous information a2 is present at the output 7. Further, Q1 and Q2 denote an information flow occurring at the respective outputs 7 and 10, which information flows are plotted in FIGS. 2a and 2b as time diagrams as a function of the time t. Information flows Q1 up to and including Q9, which will be further elucidated, are plotted by way of example for the case of a non-interlaced line raster with a number of lines amounting to 2 mH in a frame period of TP in the source 6. It is assumed here that the transmission channel 3 is intended for a standard single interlaced television system with a number of lines mH in a frame period TP=2TV.

Figure 2A:
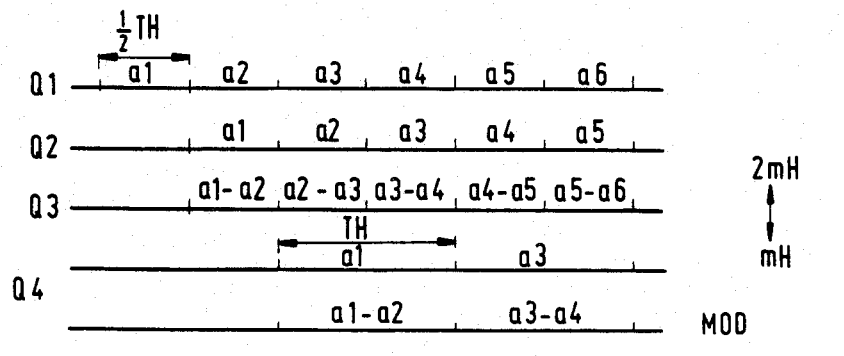
FIGS. 2a and 2b show time diagrams in explanation of a possible information transmission.

Although in the following the couplings between the circuit components will be described as connections, they do not need to be direct connections but may include signal-processing circuits, whether drawn or not. The output 10 is connected to a positive (+) input 11 of a first subtraction circuit 12 of which a negative (−) input 13 is connected to the output 7. An output 14 of the circuit 12, representing the difference in value between the delayed and undelayed information (e.g. a1−a2) at any given moment, is indicated in the information flow Q3 of FIG. 2a, is connected to an input 15 of a lowpass filter (LPF) 16 which is provided with an output 17. The output 17 is connected to an input 18 of a modulator 19, to another input 20 of which a subcarrier is supplied. The embodiment of the modulator 19 is unspecified; it may be suited for quadrature modulation as used in colour television standards. The modulator 19 is provided with an output 21 and with an on-off input 22 for putting it into operation. If the modulator 19 is put into operation via the input 22 and, via a terminal 23, the subcarrier varying in accordance with the function cos wt is supplied to the input 20 in the correct phase, the information a1−a2 modulates this subcarrier. The output 21 with the modulated subcarrier is connected to an input 24 of a bandpass filter (BPF) 25 which is provided with an output 26. Indicated at the output 26 is the modulated subcarrier with information $(a1-a2)_{MOD}$. The output 26 is connected to an input 27 of an off-on switching circuit 28 which is provided with an output 29 and an off-on switching signal input 30. The output 29 is connected to an input 31 of a first adding circuit 32 which is provided with a further input 33 and an output 34. The input 33 is connected to a master contact 35 of a selector switch 36 provided with two selector contacts 37 and 38 which are connected respectively to the outputs 10 and 7. Interconnected with contacts 37 and 38 respectively, the input 33 carries the information a1 or a2, respectively, and in the switched-on state of the switching circuit 28 the inputs 31 carries the information $(a1-a2)_{MOD}$. The output 34, where in the drawn state of the switch 36 the summed information $a1+(a1-a2)_{MOD}$ appears, is connected to an input 39 of a line-number (standard) conversion (LNC) circuit 40 which, with an output 41, is connected to the output 2 of the information transmitter 1. The circuit 40 delivers the information flow Q4, the instantaneous value for which the information $a1^x=a1(a1-a2)_{MOD}$ is given. This information is present when the circuit 28 is switched on. In this case there is locally no change of information in a displayed picture, as determined by a movement detector (MD) 42. An input 43 of the detector 42 is connected to the output 10, and an output 44 thereof is connected to the switching signal input 30. Another input 45 is connected to an output 46 of the source 6. Here it is taken that the information appearing at the output 46 occurs one field or frame period minus one line period earlier than the information at the output 7. The detector 42 detects local changes in picture information which mostly stem from movement in the picture, but may also be due to a local change in picture intensity. Instead of the application to the switching circuit 28, the output 44 of the movement detector 42 via an on-off selector switch 47, provided with two switching contacts 48 and 49, can be connected to an on-off switching input 22 of the modulator 19.

A possible embodiment of the line-number (standard) conversion circuit 40 will be found in an article published in Philips Research Report 28, 1973, pages 377 up to and including 390, entitled "Standards conversion of a TV signal with 625 lines into a videophone signal with 313 lines". Here the numbers of lines have to be adapted respectively to 1249 and 1049, and to, respectively, 625 and 525. Other numbers of lines are possible for high-definition television.

In the information receiver 5 the input 4 coupled with the transmission channel 3 is connected to an input 50 of a line-number (standard) reconversion (LNR) circuit 51 which is provided with an output 52. The input 4 receives the information flow Q4 from the channel 3. A possible embodiment of the said standard reconversion circuit 51 will be found in an article published in Philips Research Reports 29, 1974, pages 413 up to and including 428, entitled "Standards conversion of a videophone signal with 313 lines into a TV signal with 625 lines". Here the numbers of lines have to be adapted respectively to 625 and 525 and to 1249 and 1049, respectively. Here again, other numbers of lines are possible for high-definition television.

The output 52 in the information receiver 5 is connected to an input 52 of a filter circuit 54 which is provided with two outputs 55 and 56. Shown with the filter circuit 54 are two filter characteristics which are deemed to be present between the input 53 and the respective outputs 55 and 56. Between the input 53 and the output 55 a notch filter characteristic is present as shown, and between the input 53 and the output 56 a complementary bandpass filter characteristic is present, as shown by way of example. The result is that the output 55 delivers the instantaneous information a1 in an information flow Q5 and the output 56 at the same time carries the instantaneous information $(a1-a2)_{MOD}$ as the modulated subcarrier. The given embodiment of the filter circuit 54 offers the advantage of a structure which is simple and familiar. The simplest structure is that which involves merely subcarrier suppression between input 53 and output 55. The output 56 is connected to an input 57 of a demodulator 58 which is provided with an output 59 and a further input 60 for supply of the subcarrier. To this end the input 60 is connected to a terminal 61 for the supply in the correct phase of the subcarrier varying in accordance with the function cos wt. The output 59 is connected to an input 62 of a lowpass filter (LPF) 63 which is provided with an output 64. At the output 64 there appears the instantaneous information (a1−a2) in the information flow Q6 which is supplied to a negative (−) input 65 of a superposition circuit 66 drawn as a subtraction circuit, a positive (+) input 67 of which is connected to the output 55. At the same time there appears at an output 68 of the superposition circuit 66 the instantaneous information a2 in the information flow Q7. The implementation of the superposition circuit 66 as a subtraction or adding circuit depends on the polarity during demodulation and the position of the switch 36 in the information transmitter 1. The output 68 with the information a2 is connected to an input 69 of a second delay device 70 having a time delay equal to the line period ($\frac{1}{2}$TH) which belongs to the video signal source 6 present in the information transmitter 1. An output 71 of the delay device 70 is connected to an input 72 of a switch-over circuit 73 to which the information flow Q8 is supplied. Another input 74 of the circuit 73 is connected to the output 55, and a switching signal input 75 is connected to a terminal 76 for the supply of a switch-over signal SH varying as a function of time in the manner shown. An output 77 of the circuit 73 is connected to an input 78 of a device (DISP) 79 for picture display or signal pick-up and display, such as tape or disc pick-up and reproduction devices. From the drawn switch-over signal SH it follows that the input 72 and 74, during the said line periods $\frac{1}{2}$TH, are alternately coupled with the output 77. Upon interconnection with the input 74 it follows that in the position shown the information a1 is passed on, and in the next line period the information a2 is passed on, leading to the information flow Q9 (FIG. 2a).

Figure 2B:
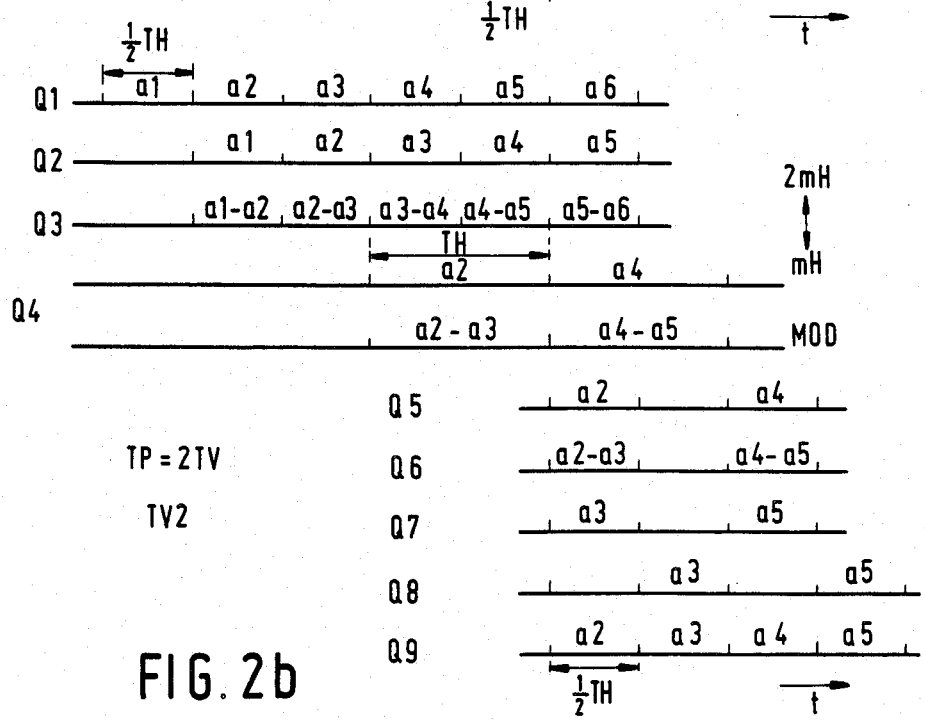

To elucidate the operation of the television system given in FIG. 1, time diagrams of the information flows Q1 up to and including Q9 are presented in FIGS. 2a and 2b by way of example. The starting point here is a video signal source 6 operating with a non-interlaced line raster with a number of lines equal to 2 mH, operating with a transmission channel 3 suitable for a standard interlaced system having a number of lines mH. FIG. 2a relates to a first field period TV1 and FIG. 2b to a second field period TV2 which together, in the frame period TP=2TV, would form the interlaced picture displayed on the screen of a standard picture display device when supplied with the information flow Q4.

In FIGS. 2a and 2b the line period $\frac{1}{2}$TH belonging to the source 6 is indicated beside the original information flow Q1. After the time delay of a line period the difference information flow Q3 is formed from the information flows Q2 and Q1. The information flow Q4 appearing after the conversion circuit 49 in FIG. 1 contains in the standard line periods TH during the field period TV1 the information a1+(a1−a2)$_{MOD}$, a3+(a3−a4)$_{MOD}$ and so on. During the field period TV2 in FIG. 2b the information a2+(a2−a3)$_{MOD}$, a4+(a4−a5)$_{MOD}$, and so on is transmitted in the information flow Q4. When the information receiver 5 in FIG. 1 is used the information flows Q5 and Q6, Q7 and Q8 result in the information flow Q9 which is suitable for high-definition storage or display. Here the information flow Q5 is present with it full bandwidth so that during the field period TV1 the line information a1, a3, a5 and so on have their own full bandwidth, and the same applies during the field period TV2 for the line information a2, a4, a6 and so on. Herewith the information flow Q8 is present. A bandwidth limitation is obtained for example by application of the lowpass filter 16. The result is that during the field period TV1 the line information a2, a4, a6 and so on and during the field period TV2 the line information a3, a5 and so on are reproduced with their own limited bandwidth but supplemented with the higher frequencies from the superjacent line. The result upon reproduction is an improvement of picture definition in the field or vertical scanning direction.

It appears from the information structure described for the information flow Q4 that the television system in accordance with FIG. 1 is compatible with the described satellite broadcasting and standard systems. From the information flow Q4 in the standard colour television systems the information sequence a1, a3, ... (TV1) and a2, a4, ... (TV2) is processed as luminance information in the standard colour television display device, while the modulated subcarrier is processed as a chrominance colour subcarrier, so that in an otherwise black and white picture the upper and lower edges of image components are displayed coloured with a colour which is determined by the information sequence a1−−a2, a3−a4, ... (TV1) and a2−a3, a4−a5, ... (TV2).

Figure 3:
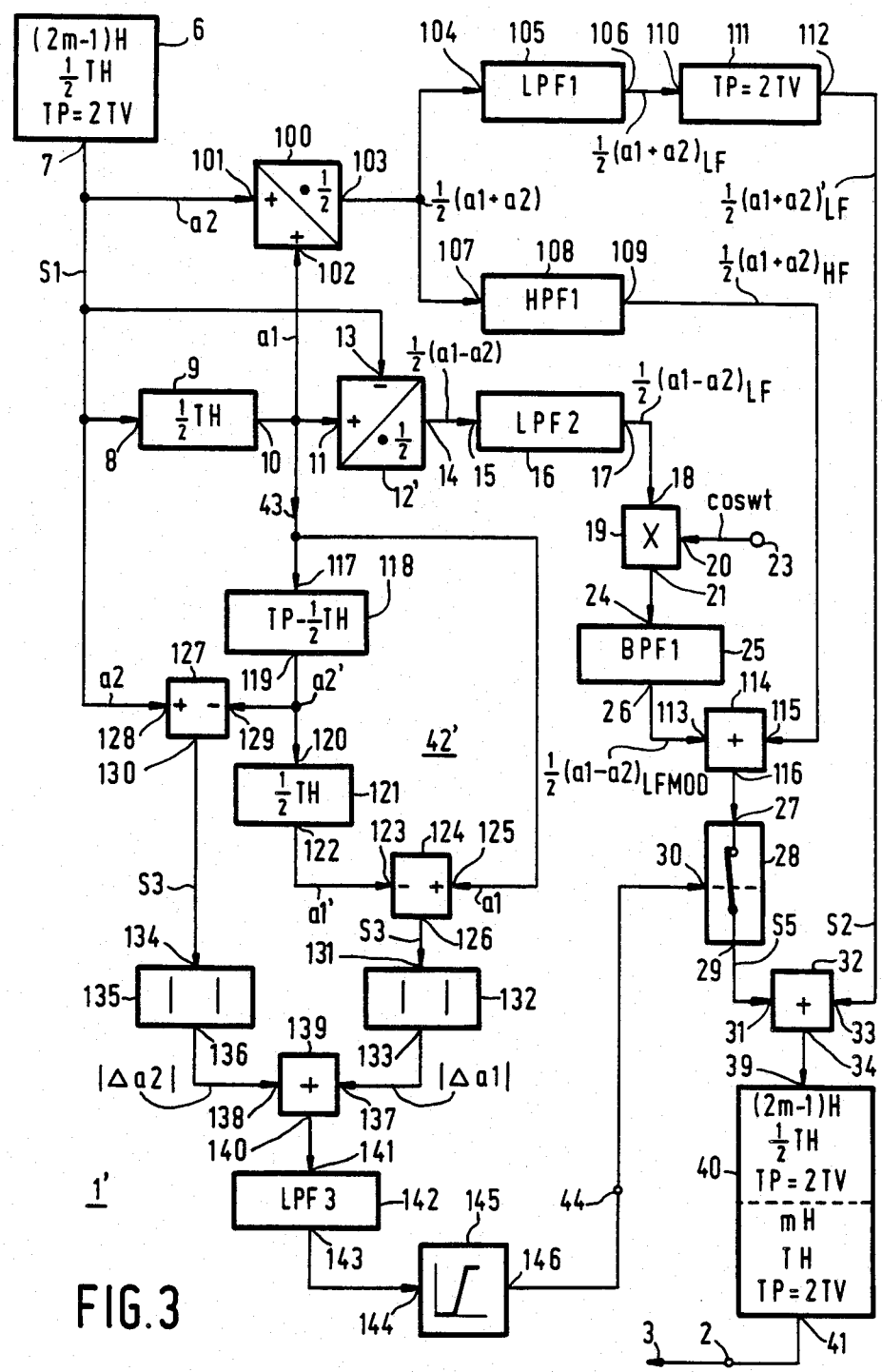
FIG. 3 shows a block diagram of a more detailed embodiment of an information transmitter in accordance with the invention, FIG. 4 similarly shows an adapted embodiment of an information receiver.
Figure 4:
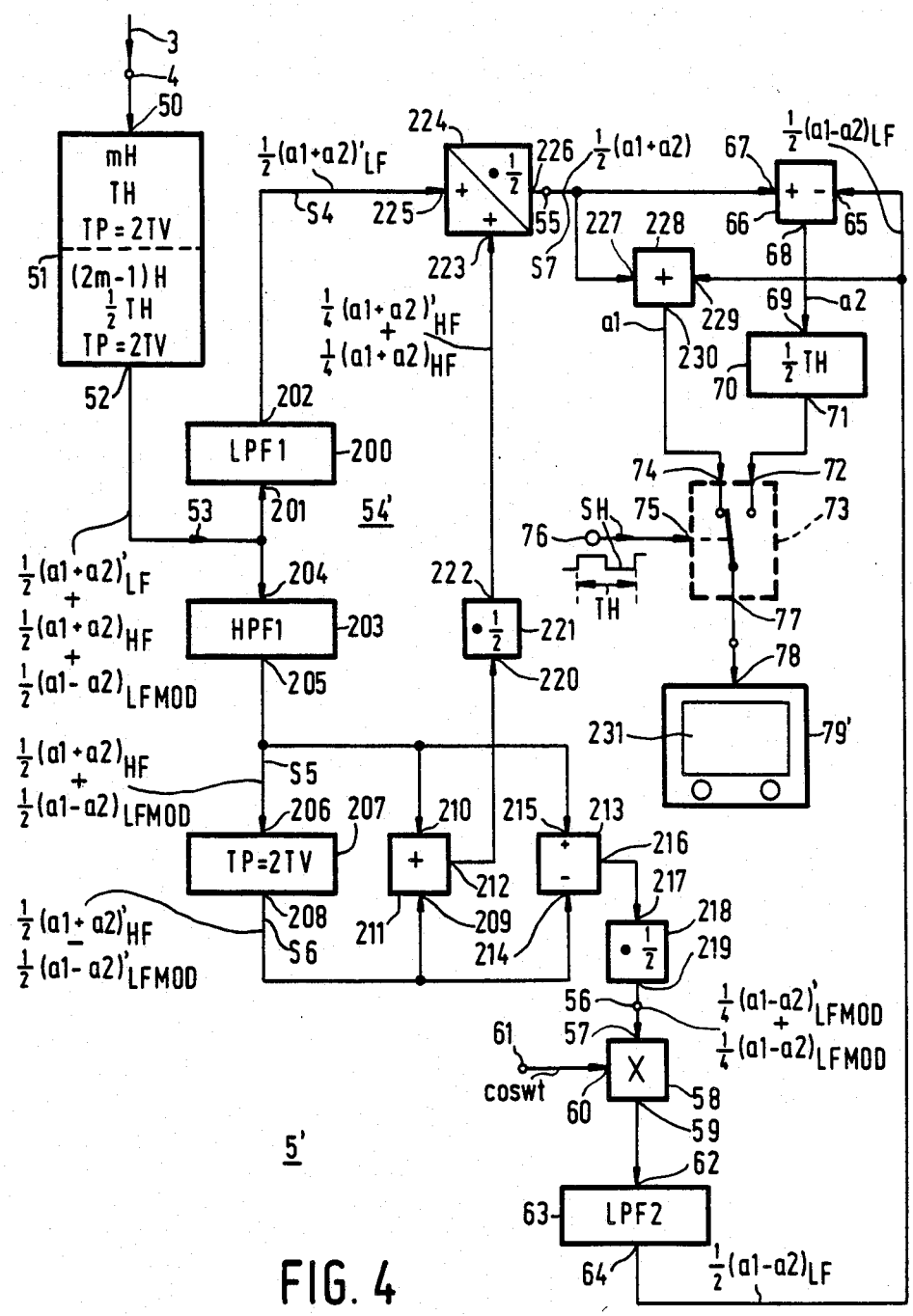

FIG. 3 gives a more detailed embodiment of an information transmitter 1', and FIG. 4 gives an embodiment of an information receiver 5' for the present television system. Components already described with reference to FIG. 1 are given in FIGS. 3 and 4 with the same indications or with a prime if some change has been made. In FIG. 3 it is indicated for the video signal source 6 that it operates with a number of lines equal to (2m−1)H with approximately the line period $\frac{1}{2}$TH (m/2m−1 TH) and the frame period TP=2TV. From the uneven number of lines of (2m−1)H it follows that interlacing is used at the source 6. Apart from a difference signal $\frac{1}{2}$(a1−a2) being formed by means of the first delay device 9 via the subtraction and halving circuit 12', a sum signal $\frac{1}{2}$(a1+a2) is formed by means of an extra (second) adding and halving circuit 100. For this purpose inputs 101 and 102 of the circuit 100 are connected to the respective outputs 7 and 10. S1 at the output 7 denotes an information flow for which a time diagram is given in FIG. 5b, which also shows time diagrams of information flows S2 up to and including S7. An output 103 of the circuit 100 is connected to an input 104 of a first lowpass filter (LPF1) 105 which is provided with an output 106 at which the frequency-limited information $\frac{1}{2}$(a1+a2)$_{LF}$ appears. Further the output 103 is connected to an input 107 of a complementary highpass filter (HPF1) 108 which is provided with an output 109, at which high-frequency information $\frac{1}{2}$(a1+a2)$_{HF}$ appears. The output 106 is connected to an input 110 of a third delay device 111 having a time delay equal to a frame period TP=2TV, which is provided with an output 112 at which information $\frac{1}{2}$(a1+a2)'$_{LF}$ appears. The output 112 is connected to the input 33 of the adding circuit 32. A prime notation beside a piece of information implies a time delay of one frame period.

The lowpass filter 16 with a filter characteristic LPF2 delivers frequency-limited information $\frac{1}{2}$(a1−a2)$_{LF}$ to the output 17. The bandpass filter 25 with a filter characteristic BPF1 delivers to the output 26 the modulated subcarrier which is indicated with the information $\frac{1}{2}$(a1−a2)$_{LFMOD}$ at the input 113 of a third adding circuit 114. The adding circuit 114 has a further input 115 which is connected to the output 109, and has an output 116 which is connected to the input 27. In the line-number (standard) conversion circuit 40 it is indicated that with an identical frame period TP=2TV the number of lines (2m−1)H and the appertaining line period of about $\frac{1}{2}$TH are converted into the number of lines mH and the line period TH.

FIG. 3 gives a detailed embodiment of the movement detector 42' with the input 43 and the output 44 which is connected to the input 30 of the off-on switching circuit 28. The input 43 is connected to an input 117 of a fourth delay device 118 having a time delay equal to the frame period TP minus the line period ½TH, present in the video signal source 6. An output 119 of the device 118 is connected to an input 120 of a fifth delay device 121 having a time delay equal to the said line period ½TH. An output 122 of the device 121 is connected to a negative (−) input 123 of a second subtraction circuit 124 of which a positive (+) input 125 is connected to the input 43. The output 119 and the output 122 deliver the appertaining information a2′ and a1′, respectively, and an output 126 of the circuit 124 carries difference information depending on the information a1′ or a1 supplied to the inputs 123 and 125, respectively. The further application of a third subtraction circuit 127 with a (+) input 128 connected to the output 7 and the (−) input 129 connected to the output 119 delivers to the output 130 the difference information between the information a2 and a2′. In this way, with the aid of a series arrangement (118, 121) of the fourth and fifth delay devices 118 and 121, a dual indication is obtained as to whether or not there is movement, that is to say as to whether or not there is any change in the information a1 and a1′ and between a2 and a2′, respectively. The result is optimum movement detection.

The output 126 is connected to an input 131 of a full-wave rectifying circuit 132 which is provided with an output 133 for delivering the modulus of the information a1 which is denoted by $|\Delta a1|$ in FIG. 3. Likewise the output 130 is connected to an input 134 of a full-wave rectifying cirfcuit 135 which delivers to an output 136 the information $|\Delta a2|$. The output 133 and the output 136 are connected respectively to the inputs 137 and 138 of a fourth adding circuit 139, of which an output 140 is connected to an input 141 of a third low-pass filter (LPF3) 142. An output 143 of the filter 142 is connected to an input 144 of a noise threshold circuit 145 which is provided with an output 146. The output 146 is connected to the output 44 of the movement detector 42′ which is connected to the off-on switching input 30 of the switching circuit 28. Instead of the embodiment of the detector 42′ given in FIG. 3, the subtraction circuits 124 and 127 can be combined and their output followed by a single full-wave rectifying circuit. In this case, however, changes in information in a1 and a2 occurring with opposite polarity could compensate one another.

The movement detector 42′ can operate satisfactorily without the application of the lowpass filter 142. Depending on the frequency spectrum of the information flow S1 at the output 7 of the source 6, optimum operation is obtained when the filter 142 is used as a smoothing filter. For this purpose the filter 142 has for example a frequency band LPF3 of 0 to 2 MHz.

For further frequency bands the following is given by way of example. If the transmission channel 3 has a frequency band of 0 to 8 MHz, as proposed for satellite broadcasting, the information flow S1 can have a frequency band of 0 to 16 MHz. The frequency band LPF1 can now be chosen to lie between 0 and 8 MHz, to which the complementary frequencyband HPF1 links up and runs through to 8 to 16 MHz. For the frequency band LPF2 a range from 0 to 4 MHz or less can be chosen, in which case, given the choice of about 12 MHz for the subcarrier (function cos wt), a modulated subcarrier with a base frequency band of 8 to 16 MHz follows. When the bandpass filter 25 is used with a frequency band BPF1 from 8 to 16 MHz, higher frequency components that might occur are suppressed. With the frequency values given by way of example the result is that the information flow in the transmission channel has a bandwidth of 0 to 8 MHz, and interleaved with it is a modulated carrier (of about 6 MHz) from 4 to 8 MHz. As will appear in the description of the information receiver 5′ in FIG. 4, it is advantageous to select the carrier frequency as laid down in the NTSC standard. With this standard the modulated (colour) subcarrier is present in antiphase in each frame period.

Referring back to FIG. 1, it is remarked that the frequency bands LPF and LPF2 or BPF and BPF1 respectively, can be identical. In the absence of the lowpass filter 16 with the frequency band LPF, the subcarrier frequency could be chosen at about half the maximum video signal frequency for the source 6. It then automatically follows that the bandwidth of the difference information (a1−a2) relative to the original information a1 must be halved. When single sideband modulation is used and a subcarrier frequency lying at the maximum luminance or chrominance frequency, respectively, the maximum band-width is transmitted.

It appears from FIG. 3 that if no movement is detected the output 34 carries composite information in accordance with the formula: $\frac{1}{2}(a1+a2)'_{LF}+\frac{1}{2}(a1+a2)_{HF}+\frac{1}{2}(a1-a2)_{LFMOD}$. If movement is, however, detected, only the information $\frac{1}{2}(a1+a2)'_{LF}$ is transmitted. The advantages of using the filters 105 and 108 and the delay device 111 will be described with reference to FIGS. 5a and 5b.

The embodiment of the information receiver 5′ in FIG. 4 will be described in accordance with the description of the information transmitter 1′ in FIG. 3. The data given with the line-number (standard) reconversion circuit 51 are in accordance with those given with the circuit 40 in FIG. 3. In this case the information is given for alternate lines. The output 52, as in FIG. 4, delivers in the absence of movement the information in accordance with the given formula to the input 53 of the filter circuit 54′. The circuit 54′ contains a lowpass filter (LPF1)200 which has an input 201 connected to the input 53 and an output 202. An input 204 of a high-pass filter (HPF1) 203 is connected to the input 53, and an output 205 is connected to an input 206 of a sixth delay device 207 having a time delay equal to the frame period TP=2TV. An output 208 of the delay device 207 and the output 205 are connected respectively to the inputs 209 and 210 of a fifth adding circuit 211 which is provided with an output 212. A negative (−) input 214 of a fourth subtraction circuit 213 is connected to the output 208 and a positive (+) input 215 is connected to the output 205. An output 216 of circuit 213 is connected to an input 217 of a halving circuit (.½) 218, of which an output 219 is connected to the output 56 of the filter circuit 54′. The output 212 of the circuit 211 is connected to an input 220 of a halving circuit 221, of which an output 222 is connected to an input 223 of a sixth adding and a halving circuit 224. An input 225 of the circuit 224 is connected to the output 202, and an output 226 is connected to the output 55 of the filter circuit 54′. The output 55 is connected not only to the input 67 of the subtraction circuit 66 but also to an input 227 of a seventh adding circuit 228, of which a further input 229 is connected to the output 64. An output 230 of the adding circuit 228 is connected to the input 74 of the switch-over circuit 73 The device 79′ is drawn in FIG. 4 as a picture display device provided with a display screen 231.

To elucidate the operation of the information receiver 5' some information at given instants is presented in FIG. 4. The output 202 delivers the information $\frac{1}{2}(a1+a2)'_{LF}$ to the input 225. The output 205 delivers the information $\frac{1}{2}(a1+a2)_{HF}+\frac{1}{2}(a1-a2)_{LFMOD}$. At the output 208 of the picture delay device 207 there appears the delayed sum information with unchanged phase, while the subcarrier frequency choice made in the manner laid down in the NTSC standard appears in the modulated information in antiphase. At the output 208 the information $\frac{1}{2}(a1+a2)'_{HF}-\frac{1}{2}(a1-a2)'_{LFMOD}$ consequently appears. The output 222 thereby delivers the information $\frac{1}{2}(a1+a2)'_{HF}+\frac{1}{2}(a1+a2)_{HF}$, which via the circuit 224, leads to the information $\frac{1}{2}(a1+a2)$ appearing at the output 226. For simplicity no distinction is made here any longer between information delayed by a frame period (prime notation) and the information which is not delayed by a frame period. When movement is locally absent both types of information are of course more or less identical.

The output 219 delivers the information $\frac{1}{2}(a1-a2)'_{LFMOD}+\frac{1}{2}(a1-a2)_{LFMOD}$ to the output 56 of the filter circuit 54'. After demodulation and filtering there appears at the output 64 the information $\frac{1}{2}(a1-a2)_{LF}$, and here again no distinction is made any longer between information delayed or not delayed by a frame period. Via the subtraction circuit 66 there appears at the output 68 the information a2, while the adding circuit 228 delivers at the same time the information a1 to the output 230. It appears that the device 79' receives the information flow a1, a2, a3, a4, a5, a6 and so on, with the information a per line period $\frac{1}{2}$TH for interlaced display in the frame period TP=2TV. With the choice of the subcarrier frequency described, and using the delay device 207, the adding circuit 211 and the subtraction circuit 213, a simple separation of information is thus achieved to obtain the sum and difference information.

With regard to the transmission of an original value (for example a3) and the difference value with the preceding (difference value a2−a3) or the succeeding original value (difference value a3−a4), the transmission of a sum value (a2+a3) and a difference value (a2−a3) offers greater accuracy in the restoration of more or less the original values. The sum value can thereby be transmitted halved, as described with reference to FIGS. 3 and 4, or formed with other factors. An example mentioned is a summation with a factor of $\frac{1}{4}$ and $\frac{3}{4}$ in the one field and with a factor of $\frac{3}{4}$ and $\frac{1}{4}$ in the interlaced second field.

The splitting of the information into low-frequency (LF) and high-frequency (HF) information by means of the complementary filters 105 and 108 in FIG. 3, whereby the high-frequency information and the modulated subcarrier are not transmitted when movement or a change in information is detected, is advantageous for picture quality because of their absence during display. The frequency bandwidth LPF2 of the filter 16 can thereby be taken as desired.

Figures 5A, 5B:
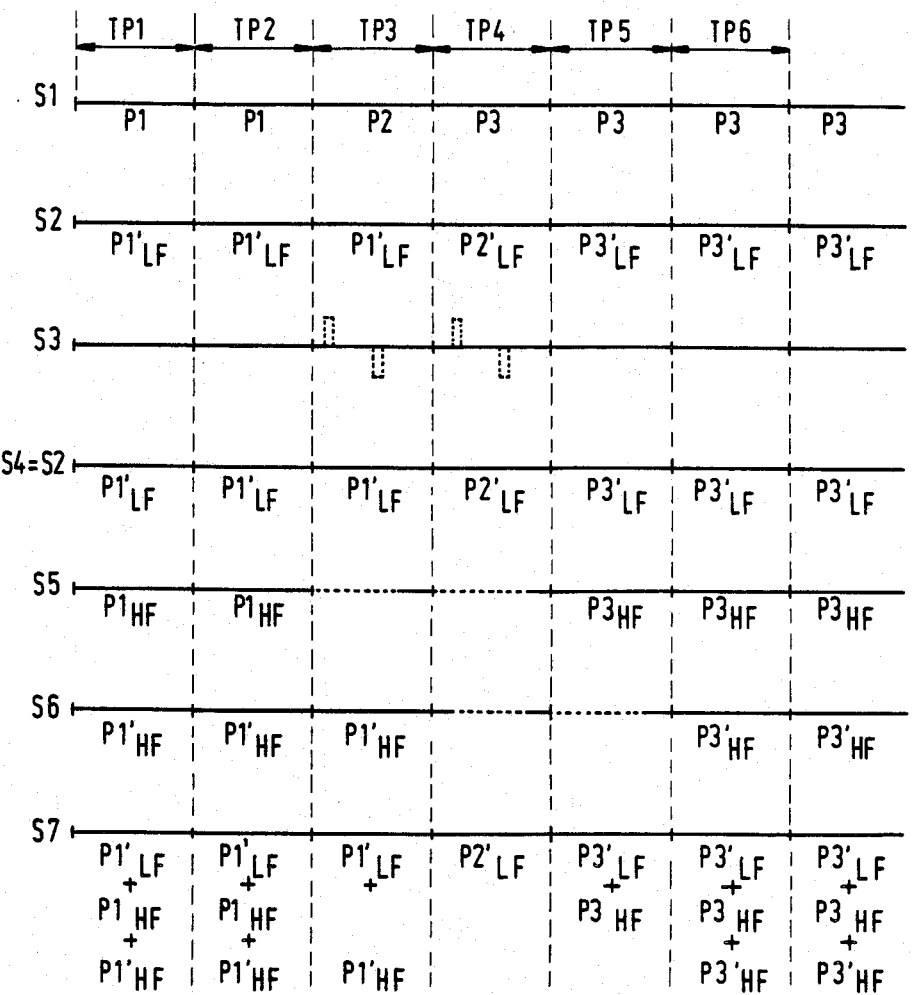
FIGS. 5a and 5b shows a television picture with changing information and information-time diagrams, respectively, in explanation of an improvement of picture quality obtained with the aid of movement detection.

To elucidate the advantage of using in FIG. 3 the delay device 111 having a time delay equal to the frame period TP and the filters 105 and 108, FIG. 5a shows the display screen 231 of the device 79' of FIG. 4, and FIG. 5b shows some information flows S1 up to and including S7 in the diagrams as a function of time t. In FIG. 5a some picture information shown on the display screen 231 is denoted by P1, P2 and P3. FIG. 5b shows a time diagram relating to the information flow S1, indicating that during six frame periods TP1, TP2, TP3, TP4, TP5 and TP6 the picture information P occurs in the sequence P1, P1, P2, P3, P3, P3 in the information flow S1. The dashed line in FIG. 5a represents a television line in the picture displayed. Here the time diagrams should be considered not only on the indicated field time basis but also on a not-indicated line time basis.

FIG. 3 shows that the information flow S1 is present at the output 7 of the source 6. At the output 112 of the delay device 111 the low-frequency information delayed over the frame period TP is present, which is shown in FIG. 5b with the information flow S2 containing the picture information P1'$_{LF}$, P1'$_{LF}$, P1'$_{LF}$, P2'$_{LF}$, P3'$_{LF}$, P3'LF. In the movement detector 42' in FIG. 3 the information flows with the sequences P1, P1, P2, P3, P3 and P1, P1, P1, P2, P3, P3 are compared with each other and movement is detected during parts of the frame periods TP3 and TP4. At the outputs 126 and 130 of the subtraction circuits 124 and 127 the respective information flow S3 occurs. If the information flow S3 drawn in FIG. 5b is considered on the line time basis, the dashed pulse shown therein belongs to the television line shown dashed in FIG. 5a. Considered on a field time basis, the dashed pulse comprises a number of pulses that depends on the shift in the field scanning direction between the picture informations P1, P2 and P3. During the pulses in the information flow S3 the off-on switching circuit 28 in FIG. 3 is switched off, and the information flow S5 in FIG. 5b appears at the output 29. Now not only is the modulated subcarrier no longer transmitted, but also the high frequency information obtained via the filter 108 is not transmitted. In FIG. 5b this is indicated in the information flow S5 by P1$_{HF}$, P1$_{HF}$, no information, no information, P3$_{HF}$, P3$_{HF}$ over the frame period TP1 up to and including TP6.

In the information receiver 5' in FIG. 4 there appears at the output 202 of the lowpass filter 200 the low frequency information denoted by S4, where S4=S2, which information flow is presented in FIG. 5b. At the output 205 of the high pass filter 203 the information flow S5 becomes available, which, via the delay device 207, leads to an information flow S6 delayed by a frame period TP. For the information flow S6 the relevant sequence is P1'$_{HF}$, P1'$_{HF}$, P1'$_{HF}$, no information, no information, P3' $_{HF}$ for the frame periods TP1 up to and including TP6. Via the adding circuit 211, the halving circuit 221 and the adding and halving circuit 224 there appears at the output 226 the information flow S7 formed with information flows S4, S5 and S6 in the sequence indicated in FIG. 5b. During the frame periods TP1, TP2 and T$_p$6 the summed picture information P'$_{LF}$+P$_{HF}$+P'$_{HF}$ becomes available. During the frame periods TP3, TP4 and TP5, in which the effects of the changes in picture information P1, P2 and P3 appear, the information P1'$_{LF}$+P1'$_{HF}$P2'$_{LF}$, P3'LF+Π3$_{HF}$ becomes successively available. It appears that upon changes in information that occur in only two steps (P1 to P2, P2 to P3), in three successive frame periods (TP2, TP3, TP4) and similar changes in information always occur at the edges of moving parts in the picture, that the high-frequency picture information after halving is suppressed and subsequently, again after halving, is completely restored. The result is an improvement of picture quality upon reproduction.

The television system in accordance with the invention as shown in FIG. 3 and FIG. 4 has been described for a high-definition information transmitter 1' and receiver 5', coupled by a transmission channel 3 suitable for low-definition television. The transmission of the described information difference values has been shown to result in an improvement of picture definition upon reproduction in the vertical direction.

As already mentioned, the improvement of vertical definition can also be achieved with television systems that operate line sequentially instead of field sequentially. Reference has been made to the SECAM system and to the time-division multiplex system with time-compressed chrominance, as proposed for direct satellite broadcasting. In both cases half the chrominance information is transmitted alternately per line period. In a system according to the invention the other half of the chrominance information is used for the formation of the described difference value which modulates the subcarrier, whereby the modulated subcarrier is transmitted interleaved respectively with the luminance or the original chrominance information. For purposes of the ensuing claims, the term "luminance" is defined to include both situations, i.e. the interleaving of the difference information with either luminance or chrominance information, respectively.

What is claimed is:

1. A television system with transmission of additional information pertaining to the television field-scanning direction, wherein a selected one of the luminance and chrominance information is transmitted over a transmission channel from an output of an information transmitter to an input of a least one information receiver, which additional information modulates a subcarrier which in an interleaving frequency system is transmitted with the selected one of the luminance and chrominance information, characterized in that:

(a) the information transmitter comprises:
       a video signal source,
       a first delay device having a time delay equal to a line period of said video signal source and an input connected to an output of said video signal source,
       a first subtraction circuit having a first input connected to the output of the video signal source and a second input connected to an output of the first delay device,
       a modulator having a first input connected to an output of said first subtraction circuit and a second input supplied with a subcarrier,
       a first adding circuit having a first input, a second input, and an output which serves as the output of the transmitter and supplies a modulated subcarrier representing the additional information interleaved with the selected one of the luminance and chrominance information to the transmission channel,
       a second adding circuit having a first input connected to the output of the video signal source and a second input connected to the output of the first delay device,
       a first lowpass filter having an input connected to an output of the second adding circuit and an output connected to the first input of the first adding circuit,
       a highpass filter complementary to said lowpass filter and having an input connected to the output of the second adding circuit,
       a third adding circuit having a first input connected to an output of said highpass filter and a second input connected to an output of the modulator,
       an off-on switching circuit having a first input connected to an output of said third adding circuit, a second input receiving a switching signal from a movement detector, and an output connected to the second input of the first adding circuit; and (b) the information receiver comprises:
       filter circuit means for receiving information over the transmission channel and separating the information into a modulated subcarrier output and an output furnishing the selected one of the luminance and chrominance information,
       a demodulator having a first input connected to the modulated subcarrier output of the filter circuit means and a second input supplied with the subcarrier,
       a superposition circuit having a first input connected to the output furnishing the selected one of the luminance and chrominance information of said filter circuit means and a second input connected to an output of the demodulator,
       a second delay device having a time delay equal to the line period of said video signal source and an input connected to an output of said superposition circuit, and
       a switch-over circuit having two inputs and an output, one of said inputs being connected to an output of said other delay device, the second of said inputs being connected to the output furnishing the selected one of the luminance and chrominance information of said filter circuit means, the inputs of said switch-over device being alternately coupled with the output during consecutive line periods of the switch-over device, which output is coupled to a display device.

2. The television system of claim 1, wherein the information transmitter further comprises:
   a second lowpass filter coupled between the output of said first subtraction circuit and the first input of the modulator; and
   a bandpass filter coupled between the output of the modulator and the second input of the first adding circuit.

3. The television system of claims 1 or 2, wherein the information transmitter further comprises a third delay device having a time delay equal to a television frame period, said third delay device being coupled between the output of the second adding circuit and the first input of the first adding circuit.

4. The television system of claim 3, wherein the movement detector of the information transmitter comprises:
   a series arrangement of a fourth delay device having a time delay equal to the television frame period minus a line period belonging to the video signal source, and a fifth delay device having a time delay equal to a like line period, the fourth delay device having an input connected to the output of said first delay device;
   a second subtraction circuit having two inputs coupled respectively with the input and the output of said series arrangement;
   a third subtraction circuit having two inputs coupled respectively with the output of the video signal source and an output of the fourth delay device; and
   a full-wave rectifying and threshold circuit coupling an output of the second subtraction circuit and an output of the third subtraction circuit with the switching signal input of the off-on switching circuit.

5. The television system of claim 4, wherein said rectifying and threshold circuit is preceded by a third lowpass filter.

6. The television system of claim 4, wherein the filter circuit means in the information receiver is implemented with a bandpass filter means and a notch filter means, the notch filter means being present between the filter circuit means input and the output furnishing the selected one of the luminance and chrominance information, the bandpass filter means being present between the filter circuit means input and the modulated subcarrier output.

7. The television system of claim 4, wherein the filter circuit means of the information receiver comprises:
   a sixth delay device having a time delay equal to one television frame period, an input thereof being coupled via a highpass filter with the input of the information receiver;
   a fifth adding circuit and a fourth subtraction circuit, the inputs of each being coupled with the input and the output, respectively, of the sixth delay device; and
   a sixth adding circuit having one input connected to an output of the fifth adding circuit and another input coupled via a lowpass filter with the input of the information receiver, the output of the sixth adding circuit serving as the output furnishing the selected one of the luminance and chrominance information of the filter circuit means, and the output of the fourth subtraction circuit serving as the modulated subcarrier output of the filter circuit means.

8. The television system of claim 3, wherein the filter circuit means in the information receiver is implemented with a bandpass filter means and a notch filter means, the notch filter means being present between the filter circuit means input and the output furnishing the selected one of the luminance and chrominance information, the bandpass filter means being present between the filter circuit means input and the modulated subcarrier output.

9. The television system of claim 2, wherein:
   (a) the information transmitter further comprises a third delay device having a time delay equal to a television frame period, said third delay device being coupled between the output of the second adding circuit and the first input of the first adding circuit;
   (b) the movement detector of the information transmitter comprises:
      a series arrangement of a fourth delay device having a time delay equal to the television frame period minus a line period belonging to the video signal source, and a fifth delay device having a time delay equal to a like line period, the fourth delay device having an input connected to the output of said first delay device,
      a second subtraction circuit having two inputs coupled respectively with the input and the output of said series arrangement,
      a third subtraction circuit having two inputs coupled respectively with the output of the video signal source and an output of the fourth delay device, and
      a full-wave rectifying and threshold circuit coupling an output of the second subtraction circuit and an output of the third subtraction circuit with the switching signal input of the off-on switching circuit;
   (c) said rectifying and threshold circuit is preceded by a third lowpass filter;
   (d) the filter circuit means of the information receiver comprises:
      a sixth delay device having a time delay equal to one television frame period, an input thereof being coupled via a highpass filter with the input of the information receiver,
      a fifth adding circuit and a fourth subtraction circuit, the inputs of each being coupled with the input and the output, respectively, of the sixth delay device, and
      a sixth adding circuit having one input connected to an output of the fifth adding circuit and another input coupled via a lowpass filter with the input of the information receiver, the output of the sixth adding circuit serving as the output furnishing the selected one of the luminance and chrominance information of the filter circuit means, and the output of the fourth subtraction circuit serving as the modulated subcarrier output of the filter circuit means; and
   (e) the superposition circuit of the information receiver comprises a subtraction circuit, and
      further comprising a seventh adding circuit located in the information receiver and having a first input which is coupled with the output of the demodulator and a second input which is coupled with the output furnishing the selected one of the luminance and chrominance information of the filter circuit means, said output furnishing the selected one of the luminance and chrominance information being coupled by the seventh adding circuit with the second input of said switch-over circuit.

10. The television system of claim 1 or claim 2, wherein the movement detector of the information transmitter comprises:
    a series arrangement of a fourth delay device having a time delay equal to the television frame period minus a line period belonging to the video signal source, and a fifth delay device having a time delay equal to a like line period, the fourth delay device having an input connected to the output of said first delay device;
    a second subtraction circuit having two inputs coupled respectively with the input and the output of said series arrangement;
    a third subtraction circuit having two inputs coupled respectively with the output of the video signal source and the output of the fourth delay device; and
    a full-wave rectifying and threshold circuit coupling an output of the second subtraction circuit and an output of the third subtraction circuit with the switching signal input of the off-on switching circuit.

11. The television system of claim 10, wherein said rectifying and threshold circuit is preceded by a third lowpass filter.

12. The television system of claim 1 or 2, wherein the filter circuit means in the information receiver is implemented with a bandpass filter means and a notch filter means, the notch filter means being present between the filter circuit means input and the output furnishing the selected one of the luminance and chrominance information, the bandpass filter means being present between the filter circuit means input and the modulated subcarrier output.

13. The television system of claim 1, wherein the superposition circuit of the information receiver comprises a subtraction circuit; and further comprising a seventh adding circuit located in the information receiver and having a first input which is coupled with the output of the demodulator and a second input which is coupled with the output furnishing the selected one of the luminance and chrominance information of the filter circuit means, said output furnishing the selected one of the luminance and chrominance information being coupled by the seventh adding circuit with the second input of said switch-over circuit.

14. The television system of claim 1, wherein the movement detector of the information transmitter comprises:

a series arrangement of a fourth delay device having a time delay equal to the television frame period minus a line period belonging to the video signal source, and a fifth delay device having a time delay equal to a like line period, the fourth delay device having an input connected to the output of said first delay device;

a second subtraction circuit having two inputs coupled respectively with the input and the output of said series arrangement;

a third subtraction circuit having two inputs coupled respectively with the output of the video signal source and an output of the fourth delay device; and a full-wave rectifying and threshold circuit coupling an output of the second subtraction circuit and an output of the third subtraction circuit with the switching signal input of the off-on switching circuit; and wherein the filter circuit means in the information receiver is implemented with a bandpass filter means and a notch filter means, the notch filter means being present between the filter circuit means input and the output furnishing the selected one of the luminance and chrominance information, the bandpass filter means being present between the filter circuit means input and the modulated subcarrier output.

15. The television system of claim 1, wherein the filter circuit means of the information receiver comprises:

a sixth delay device having a time delay equal to one television frame period, an input thereof being coupled via a highpass filter with the input of the information receiver;

a fifth adding circuit and a fourth subtraction circuit, the inputs of each being coupled with the input and the output, respectively, of the sixth delay device; and a sixth adding circuit having one input connected to an output of the fifth adding circuit and another input coupled via a lowpass filter with the input of the information receiver, the output of the sixth adding circuit serving as the output furnishing the selected one of the luminance and chrominance information of the filter circuit means, and the output of the fourth subtraction circuit serving as the modulated subcarrier output of the filter circuit means.

16. A transmitter for use in a television system, a transmission channel of the television system having a more limited frequency bandwidth than a video signal source of the system, the transmitter contributing to an improvement of definition in the field scanning direction of information transmitted and displayed by the television system, the transmitter comprising:

a video signal source, a first delay device having a time delay equal to a line period of said video signal source and an input connected to an output of said video signal source, a first subtraction circuit having a first input connected to the output of the video signal source and a second input connected to an output of the first delay device, a modulator having a first input connected to an output of said first subtraction circuit and a second input supplied with a subcarrier, a first adding circuit having a first input, a second input, and an output which serves as the output of the transmitter a second adding circuit having a first input connected to the output of the video signal source and a second input connected to the output of the first delay device, a first lowpass filter having an input connected to an output of the second adding circuit and an output connected to the first input of the first adding circuit, a highpass filter complementary to said lowpass filter and having an input connected to the output of the second adding circuit, a third adding circuit having a first input connected to an output of said highpass filter and a second input connected to an output of the modulator, an off-on switching circuit having a first input connected to an output of said third adding circuit, a second input receiving a switching signal from a movement detector, and an output connected to the second input of the first adding circuit, whereby the subcarrier modulated with difference information pertaining to the television field-scanning direction is transmitted in an interleaving frequency arrangement with a selected one of the luminance and chrominance information from the video signal source, when static picture information occurs as detected by the movement detector.

17. The transmitter of claim 1, further comprising:

a second lowpass filter coupled between the output of said first subtraction circuit and the first input of the modulator; and a bandpass filter coupled between the output of the modulator and the second input of the first adding circuit.

18. The transmitter of claim 16, further comprising a third delay device having a time delay equal to a television frame period coupled between the output of the second adding circuit and the first input of the first adding circuit.

19. The transmitter of claim 18, wherein the movement detector of the information transmitter comprises:

a series arrangement of a fourth delay device having a time delay equal to the television frame period minus a line period belonging to the video signal source, and a fifth delay device having a time delay equal to a like line period, the fourth delay device having an input connected to the output of said first delay device;

a second subtraction circuit having two inputs coupled respectively with the input and the output of said series arrangement;

a third subtraction circuit having two inputs coupled respectively with the output of the video signal source and an output of the fourth delay device; and a full-wave rectifying and threshold circuit coupling an output of the second subtraction circuit and an output of the third subtraction circuit with the switching signal input of the off-on switching circuit.

20. The transmitter of claim 19, wherein said rectifying and threshold circuit is preceded by a third lowpass filter.

21. The transmitter of claim 20, further comprising:

a second lowpass filter coupled between the output of said first subtraction circuit and the first input of the modulator;

a bandpass filter coupled between the output of the modulator and the second input of the first adding circuit; and a third delay device having a time delay equal to a television frame period coupled between the output of the second adding circuit and the first input of the first adding circuit.

22. A receiver for use in a television system having improved picture definition in a field-scanning direction, the receiver being adapted to receive and process an information signal transmitted over a transmission channel having a bandwidth more limited than that of a video signal source in the information signal transmitter, said information signal comprising a modulated subcarrier in an interleaving frequency relationship with a selected one of the luminance and chrominance information, the subcarrier being modulated with information pertaining to the television field-scanning direction, the receiver comprising:

filter circuit means for receiving the information signal over the transmission line and separating the information signal into a modulated subcarrier output and an output furnishing the selected one of the luminance and chrominance information;

a demodulator having a first input connected to the modulated subcarrier output of the filter circuit means and a second input supplied with the subcarrier;

a subtraction circuit having a first input connected to the output furnishing the selected one of the luminance and chrominance information of said filter circuit means and a second input connected to an output of the demodulator;

a delay device having a time delay equal to the line period of the video signal source in the information signal transmitter, and an input connected to an output of said subtraction circuit;

an adding circuit having a first input which is coupled with an output of the demodulator and a second input which is coupled with the luminance output of the filter circuit means;

a switch-over circuit having two inputs and an output, one of said inputs being connected to an output of said delay device, the other of said inputs being connected to an output of said adding circuit, the inputs of said switch-over device being alternately coupled during consecutive line periods with the output of the switch-over device, which output is coupled to a display device; and wherein the filter circuit means comprises:

a sixth delay device having a time delay equal to one television frame period, an input thereof being coupled via a highpass filter with the input of the information receiver, a fifth adding circuit and a fourth subtraction circuit, the inputs of each being coupled with the input and the output, respectively, of the sixth delay device, and a sixth adding circuit having one input connected to an output of the fifth adding circuit and another input coupled via a lowpass filter with the input of the information receiver, the output of the sixth adding circuit serving as the output furnishing the selected one of the luminance and chrominance information of the filter circuit means, and the output of the fourth subtraction circuit serving as the modulated subcarrier output of the filter circuit.

* * * * *